United States Patent
Sakoske et al.

(10) Patent No.: US 6,680,121 B2
(45) Date of Patent: Jan. 20, 2004

(54) BISMUTH-CONTAINING LASER MARKABLE COMPOSITIONS AND METHODS OF MAKING AND USING SAME

(75) Inventors: George Emil Sakoske, Washington, PA (US); Joseph E. Sarver, Washington, PA (US)

(73) Assignee: DMC2 Degussa Metals Catalysts Cerdec AG, Frankfurt (DE)

( * ) Notice: Subject to any disclaimer, the term of this patent is extended or adjusted under 35 U.S.C. 154(b) by 0 days.

(21) Appl. No.: 10/322,923

(22) Filed: Dec. 18, 2002

(65) Prior Publication Data

US 2003/0108723 A1 Jun. 12, 2003

Related U.S. Application Data

(62) Division of application No. 09/668,134, filed on Sep. 22, 2000, now Pat. No. 6,503,316.

(51) Int. Cl.$^7$ .............................. B32B 1/00; C04B 14/00
(52) U.S. Cl. ........................ 428/409; 428/689; 428/701; 428/702; 106/479; 106/418; 106/422; 106/425; 106/436; 106/450; 106/481; 106/453; 106/455; 106/456; 106/461; 423/263; 423/594; 423/593; 423/595; 423/598; 423/599; 423/600
(58) Field of Search ................................ 428/409, 689, 428/701, 702; 106/479, 418, 422, 425, 436, 450, 481, 453, 455, 456, 461; 423/263, 594, 593, 595, 598, 599, 600

(56) References Cited

U.S. PATENT DOCUMENTS

| | | |
|---|---|---|
| 3,531,391 A | 9/1970 | Palaika |
| 3,819,252 A | 6/1974 | Giglia |
| 3,874,883 A | 4/1975 | Robitaille et al. |
| 4,156,613 A | 5/1979 | Hund et al. |

(List continued on next page.)

FOREIGN PATENT DOCUMENTS

| | | |
|---|---|---|
| DE | 4212429 A | 10/1993 |
| EP | 637517 A1 | 2/1995 |
| EP | 0 761 377 A1 | 3/1997 |
| EP | 0 782 933 A1 | 7/1997 |
| JP | 1-222994 A | 9/1989 |
| JP | 1-222995 A | 9/1989 |
| JP | 04198366 A | 7/1992 |
| JP | 03250031 A | 9/1993 |
| JP | 02165001 A | 1/1994 |
| JP | 07060464 A | 3/1995 |
| JP | 07237350 A | 9/1995 |
| JP | 07266695 A | 10/1995 |
| JP | 08031682 A | 2/1996 |
| WO | WO 95/13195 | 5/1995 |
| WO | WO 96/32221 | 10/1996 |

OTHER PUBLICATIONS

Control Laser Corporation, "Laser Marking: Design and Process Fundamentals," Orlando, FL No Date.

Maurer, et al., "High Speed Laser Marking Pen–type Nd: YAG Systems," (No Date) Semiconductor Fabtech, Rofin–Sinar Laser GmbH, Marking Division, Munich, Germany.

*Primary Examiner*—Deborah Jones
*Assistant Examiner*—Ling Xu
(74) *Attorney, Agent, or Firm*—Daniel P. Cillo; Eckert Seamans Cherin & Mellott, LLC

(57) ABSTRACT

The present invention relates to additive, pigment or colorant materials which may be used for laser marking. The materials comprise oxides of bismuth and at least one additional metal. Preferred laser-markable bismuth-containing oxide compounds are of the formula $Bi_xM_yO_z$, where M is at least one metal selected from Zn, Ti, Fe, Cu, Al, Zr, P, Sn, Sr, Si, Y, Nb, La, Ta, Pr, Ca, Mg, Mo, W, Sb, Cr, Ba and Ce, x is from about 0.3 to about 70, y is from about 0.05 to about 8, and z is from about 1 to about 100. The bismuth-containing material may be dispersed in a substrate which is subsequently irradiated by a laser to provide a contrasting mark in the irradiated region.

10 Claims, 14 Drawing Sheets

U.S. PATENT DOCUMENTS

| | | |
|---|---|---|
| 4,327,283 A | 4/1982 | Heyman et al. |
| 4,388,118 A | 6/1983 | Eppler |
| 4,469,521 A | 9/1984 | Salensky |
| 4,515,867 A | 5/1985 | Bleacher et al. |
| 4,541,340 A | 9/1985 | Peart et al. |
| 4,651,313 A | 3/1987 | Guez |
| 4,710,404 A | 12/1987 | Reichert et al. |
| 4,769,310 A | 9/1988 | Gugger et al. |
| 4,847,181 A | 7/1989 | Shimokawa |
| 4,854,957 A | 8/1989 | Borrelli et al. |
| 4,861,620 A | 8/1989 | Azuma et al. |
| 4,912,298 A | 3/1990 | Daniels et al. |
| 4,941,923 A | 7/1990 | Sotogoshi et al. |
| 5,006,175 A | 4/1991 | Modly |
| 5,030,551 A | 7/1991 | Herren et al. |
| 5,061,341 A | 10/1991 | Kildal et al. |
| 5,063,137 A | 11/1991 | Kiyonari et al. |
| 5,075,195 A | 12/1991 | Babler et al. |
| 5,080,718 A | 1/1992 | Sullivan et al. |
| 5,091,284 A | 2/1992 | Bradfield |
| 5,164,005 A | 11/1992 | Kuske et al. |
| 5,206,280 A | 4/1993 | Williams |
| 5,250,112 A | 10/1993 | Wussow et al. |
| 5,269,841 A | 12/1993 | Kuske et al. |
| 5,336,312 A | 8/1994 | Byrne et al. |
| 5,397,686 A | 3/1995 | Dominick et al. |
| 5,409,742 A | 4/1995 | Arfsten et al. |
| 5,523,125 A | 6/1996 | Kennedy et al. |
| 5,543,269 A | 8/1996 | Chatterjee et al. |
| 5,554,335 A | 9/1996 | Fields et al. |
| 5,599,869 A | 2/1997 | Kurz |
| 5,609,778 A | 3/1997 | Pulaski et al. |
| 5,611,852 A | 3/1997 | Pfaff et al. |
| 5,637,244 A | 6/1997 | Erokhin |
| 5,667,580 A | 9/1997 | Babler |
| 5,740,941 A | 4/1998 | Lemelson |
| 5,747,217 A | 5/1998 | Zaklika et al. |
| 5,750,318 A | 5/1998 | Lambert et al. |
| 5,760,367 A | 6/1998 | Rosenwasser et al. |
| 5,761,111 A | 6/1998 | Glezer |
| 5,767,483 A | 6/1998 | Cameron et al. |
| 5,783,507 A | 7/1998 | Sakoske |
| 5,789,466 A | 8/1998 | Birmingham, Jr. et al. |
| 5,804,342 A | 9/1998 | Paz-Pujalt et al. |
| 5,853,955 A | 12/1998 | Towfiq |
| 5,866,644 A | 2/1999 | Mercx et al. |
| 6,075,223 A | 6/2000 | Harrison |
| 6,171,383 B1 | 1/2001 | Sakoske et al. |
| 6,238,847 B1 | 5/2001 | Axtell, III et al. |

BISMUTH-CONTAINING LASER MARKABLE COMPOSITIONS AND METHODS OF MAKING AND USING SAME

CROSS REFERENCE TO RELATED APPLICATION

This application is a divisional application of U.S. patent application Ser. No. 09/668,134 filed Sep. 22, 2000, now U.S. Pat. No. 6,503,316.

FIELD OF THE INVENTION

The present invention relates to addition, pigment or colorant materials which may be used for laser marking, and more particularly relates to bismuth-containing laser markable compositions, and methods of making and using such compositions.

BACKGROUND INFORMATION

The use of titanium dioxide as a laser markable pigment is disclosed in U.S. Pat. No. 5,091,284. However, laser marks produced from titanium dioxide suffer from poor contrast and durability. Although many different types of pigments are known, a need exists for a pigment which can be added to a substrate to produce high contrast durable laser marks.

SUMMARY OF THE INVENTION

This invention relates to the use of bismuth-containing compounds as an additive, pigment or colorant. The bismuth containing compounds are useful in substrates comprising organic chemical compositions such as plastics, rubbers and the like, and coating compositions such as paints, printing inks and the like. The bismuth-containing compounds are also useful in inorganic chemical composition substrates such as glass enamels, porcelain enamels and the like. The present bismuth-containing compounds may be used in such compositions to impart unique properties such as the ability to make high contrast laser marks and/or color changing interactions with laser beams, unique electronic properties and high IR reflectance.

An aspect of the present invention is to provide a pigment of the formula $Bi_xM_yO_z$, where M is at least one metal selected from Zn, Ti, Fe, Cu, Al, Zr, P, Sn, Sr, Si, Y, Nb, La, Ta, Pr, Ca, Mg, Mo, W, Sb, Cr, Ba and Ce, x is from about 0.3 to about 70, y is from about 0.05 to about 8, and z is from about 1 to about 100.

A further aspect of the present invention is to provide a laser markable compound comprising an oxide of bismuth and at least one additional metal selected from Zn, Ti, Fe, Cu, Al, Zr, P, Sn, Sr, Si, Y, Nb, La, Ta, Pr, Ca, Mg, Mo, W, Sb, Cr, and Ce.

Another aspect of the present invention is to provide a laser markable substrate comprising a substrate material and a bismuth-containing compound dispersed in the substrate material.

A further aspect of the present invention is to provide laser marked substrate comprising a substrate material, a bismuth-containing compound dispersed in the substrate material, and a laser-marked portion of the bismuth-containing compound providing a contrasting mark on the substrate material.

Another aspect of the present invention is to provide a method of making a laser markable compound comprising the steps of mixing bismuth oxide or precursors thereof with at least one additional metal oxide or precursors thereof, and heating the mixture.

A further aspect of the present invention is to provide a method of making a laser markable substrate comprising dispersing a bismuth-containing compound in a substrate material.

Another aspect of the present invention is to provide a method of laser marking an article comprising providing a substrate including a bismuth-containing compound and irradiating at least a portion of the substrate with a laser to form a marking thereon.

These and other aspects of the present invention will be more apparent from the following description.

DETAILED DESCRIPTION

Figure 1A:
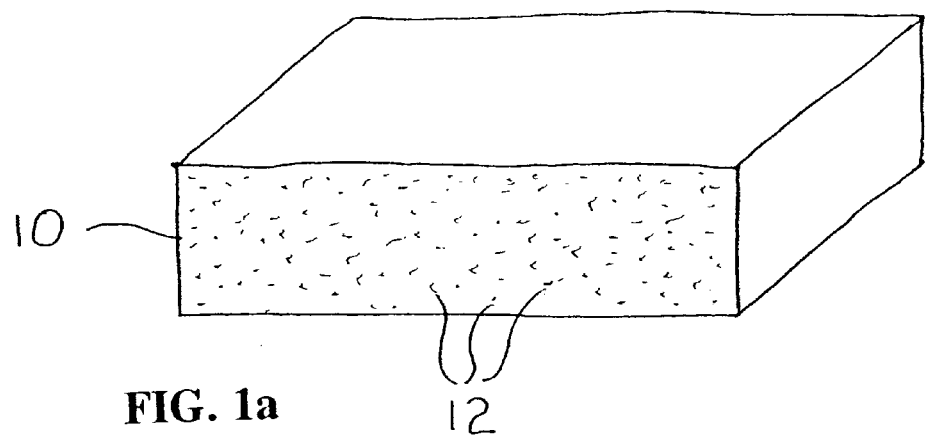
FIGS. 1a and 1b are partially schematic isometric sectional views illustrating a process of laser marking a substrate which includes a bismuth-containing composition in accordance with an embodiment of the invention.
Figure 1B:
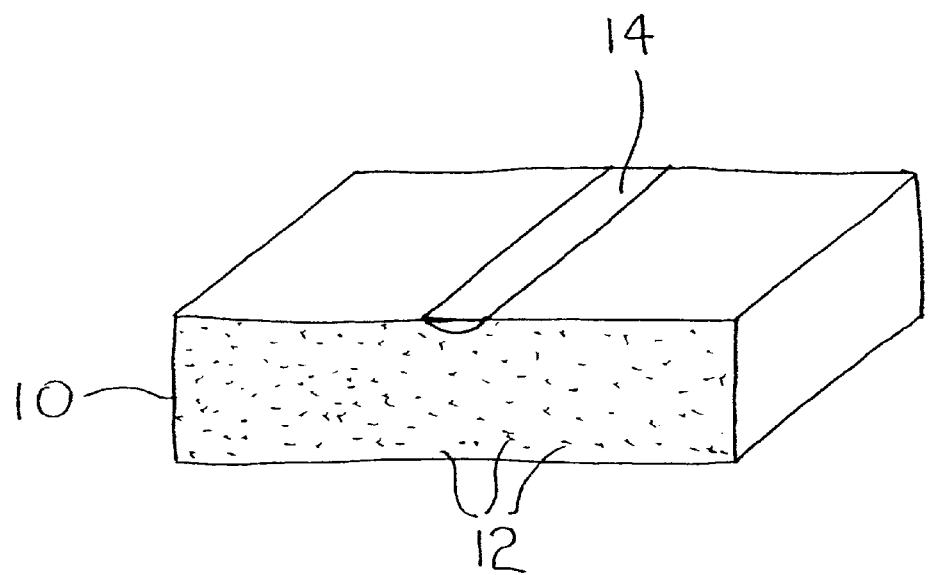
Figure 2:
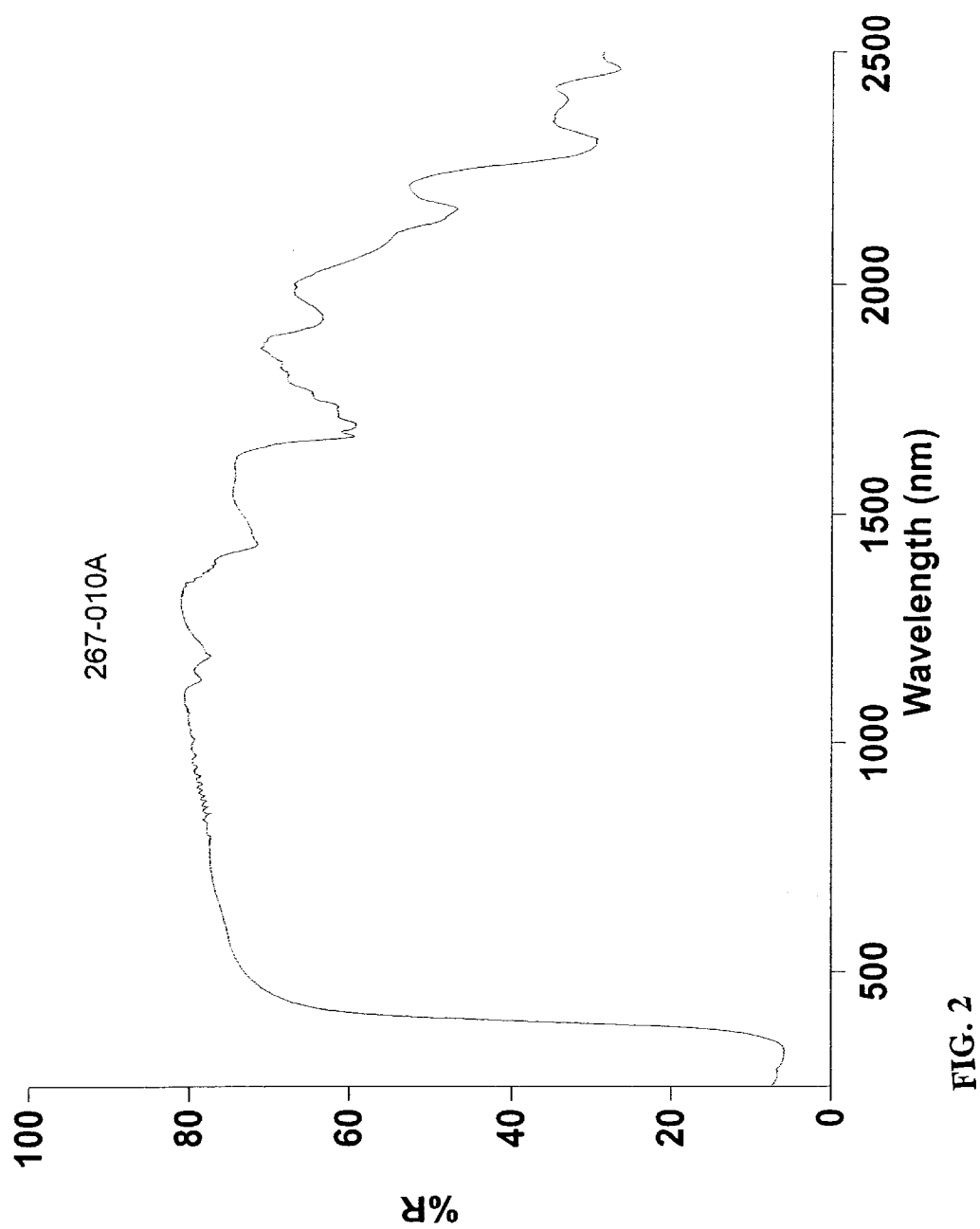
FIGS. 2–11 are graphs of reflectance versus wavelength for substrates comprising various bismuth-containing laser markable compositions of the invention.
Figure 3:
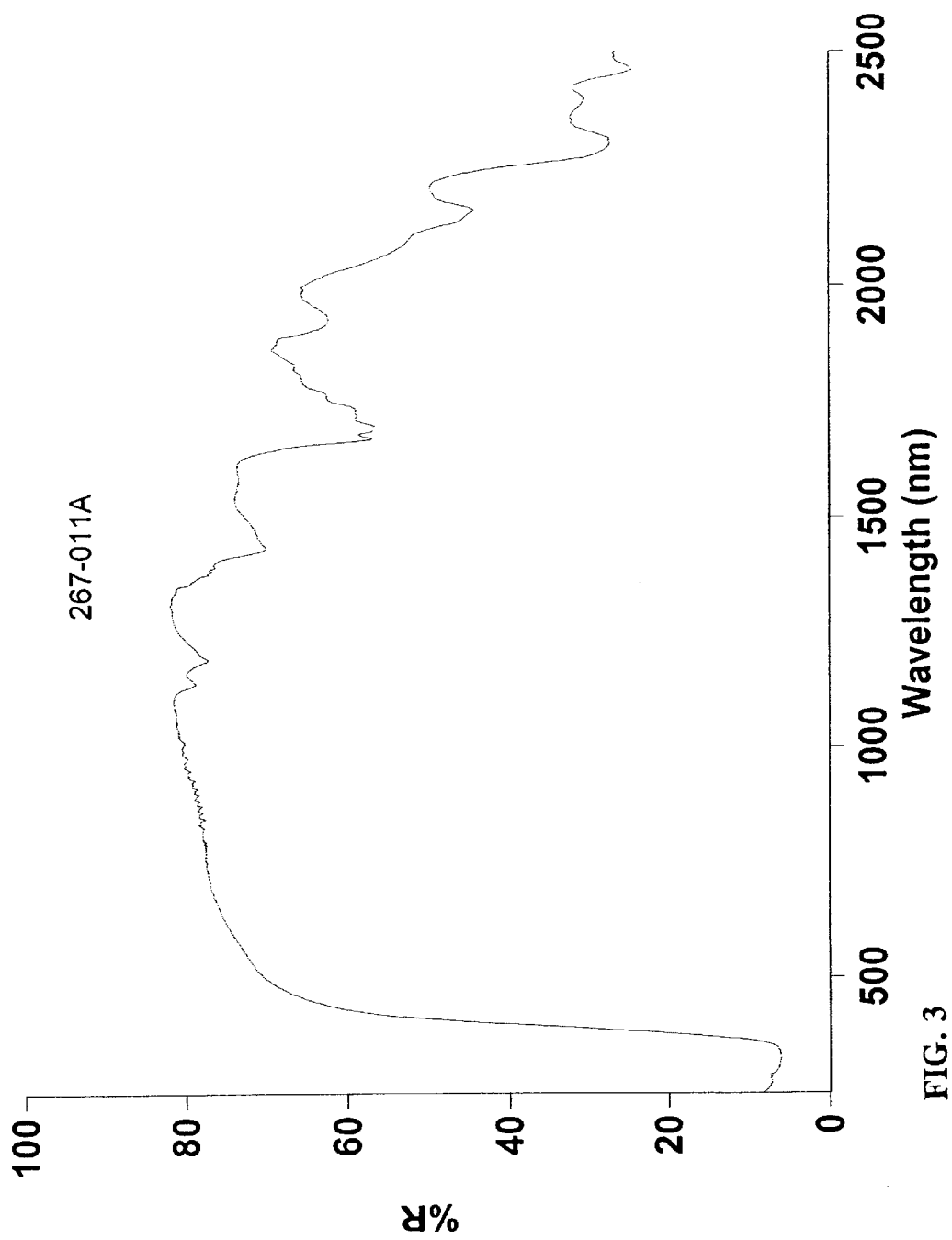
Figure 4:
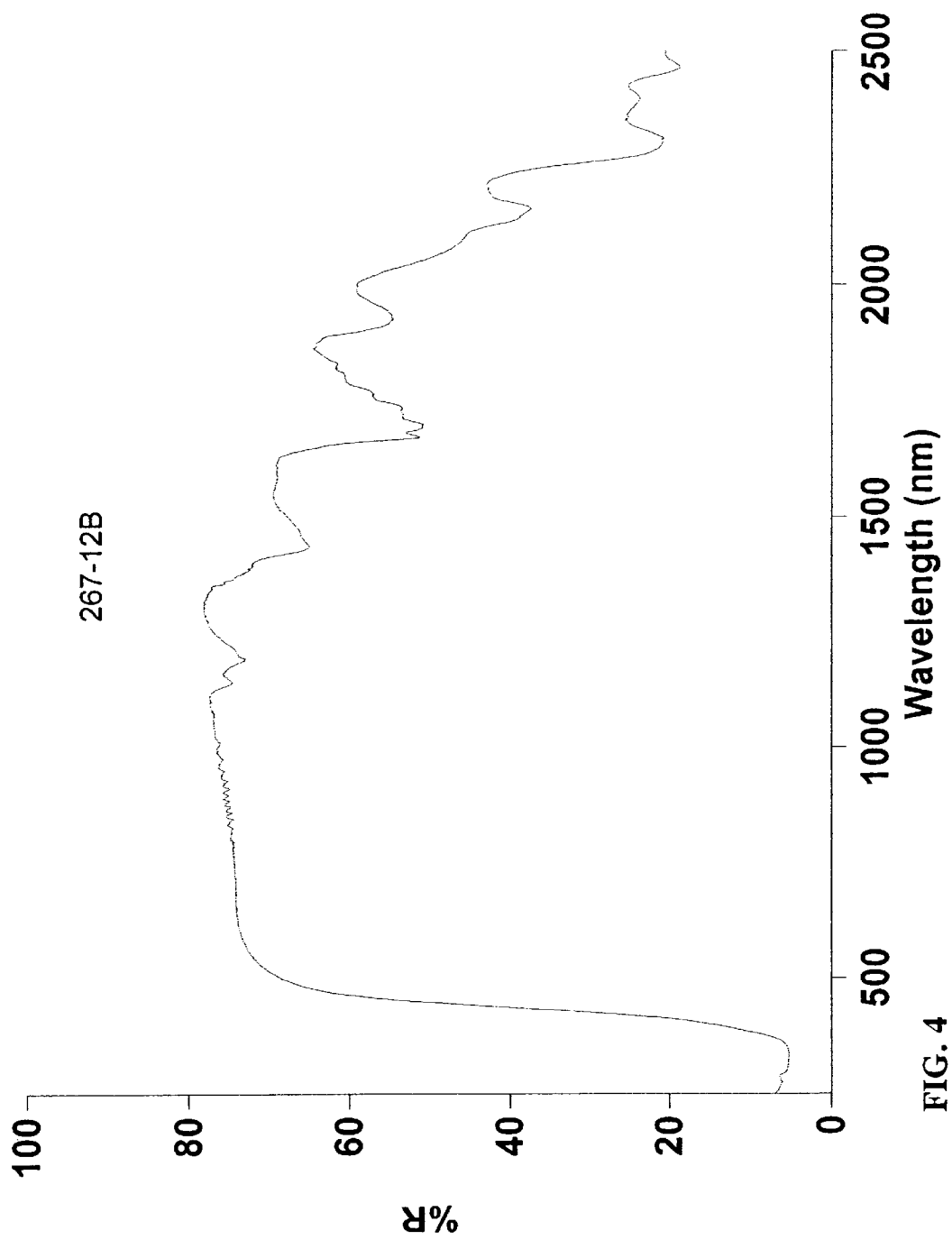
Figure 5:
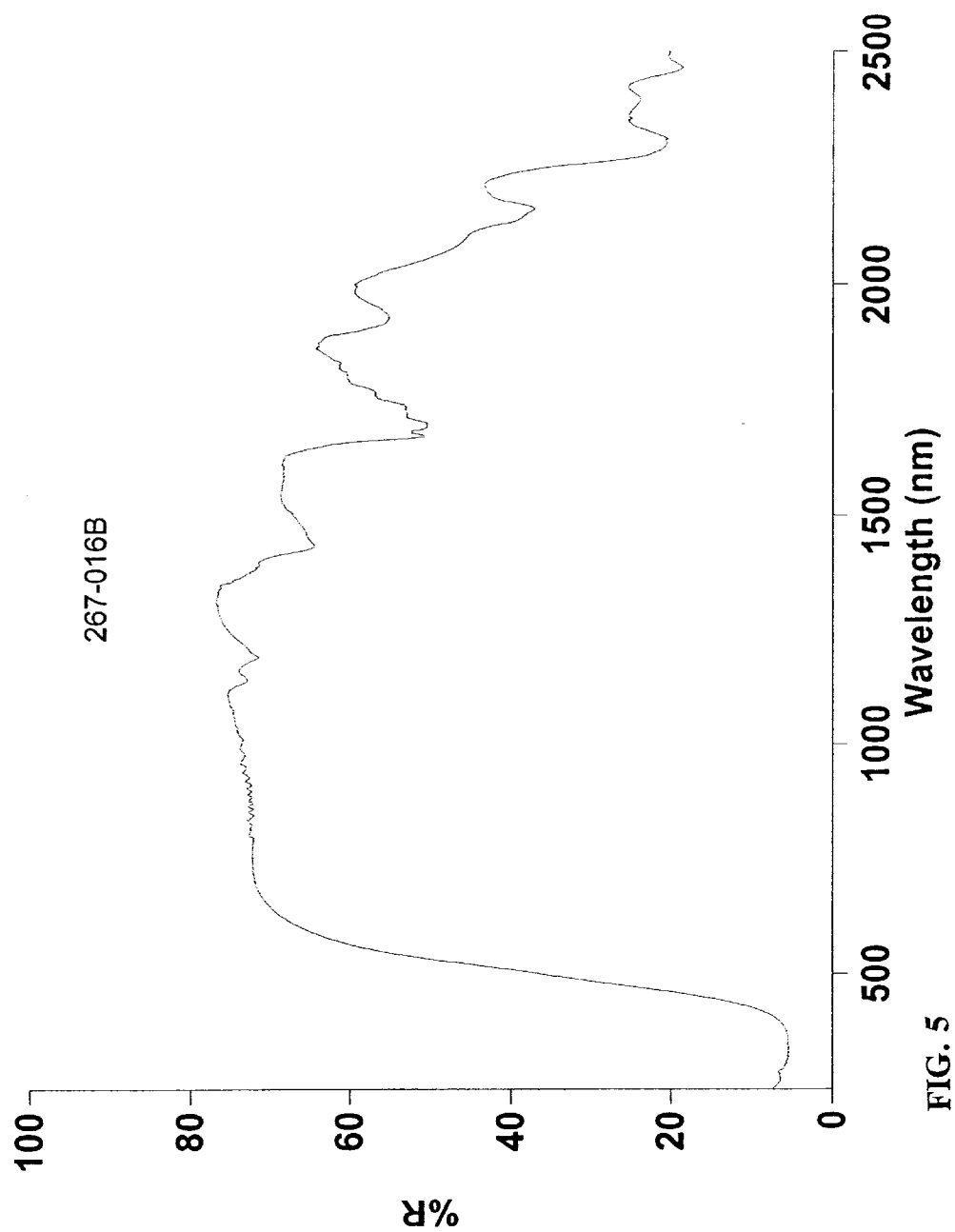
Figure 6:
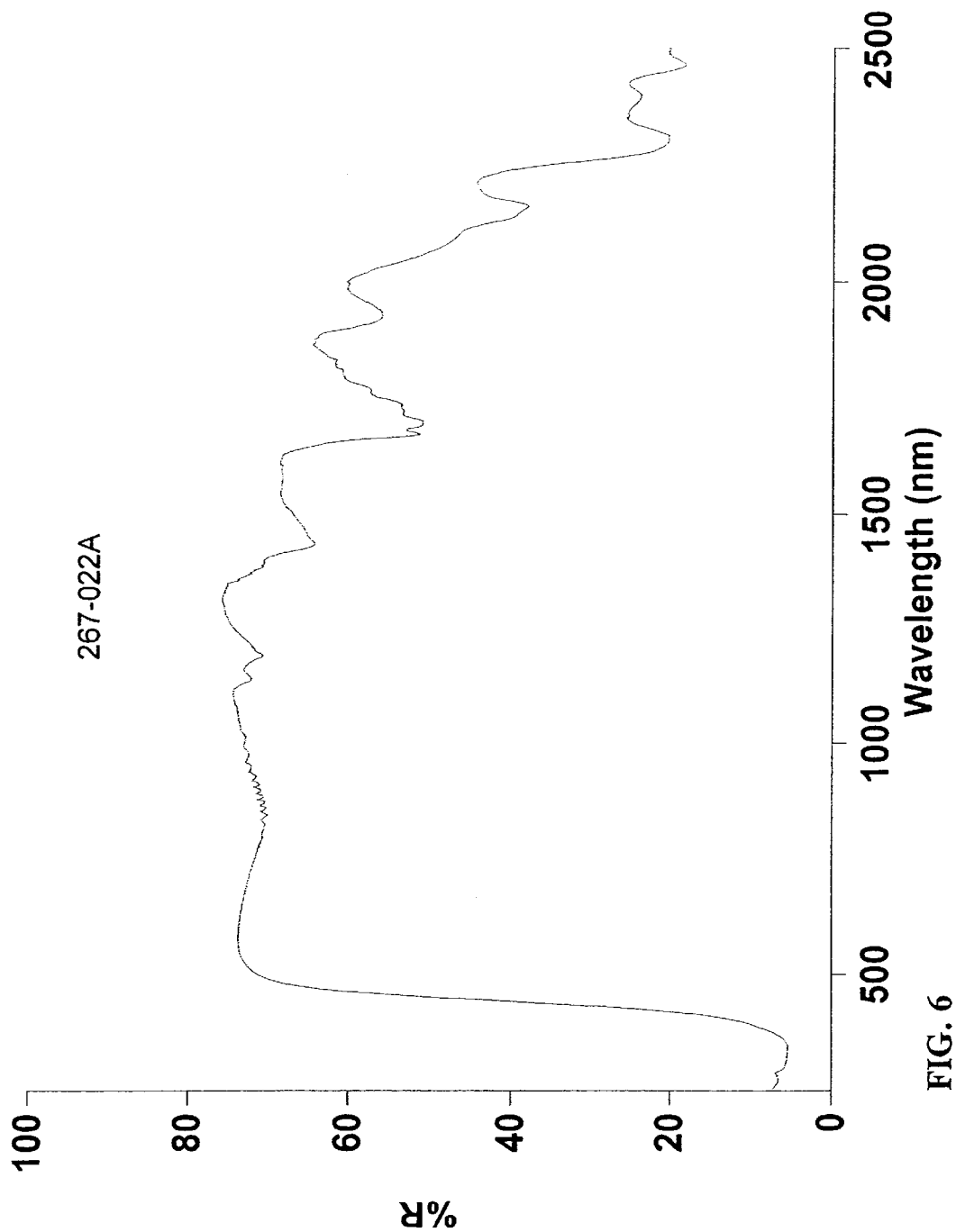
Figure 7:
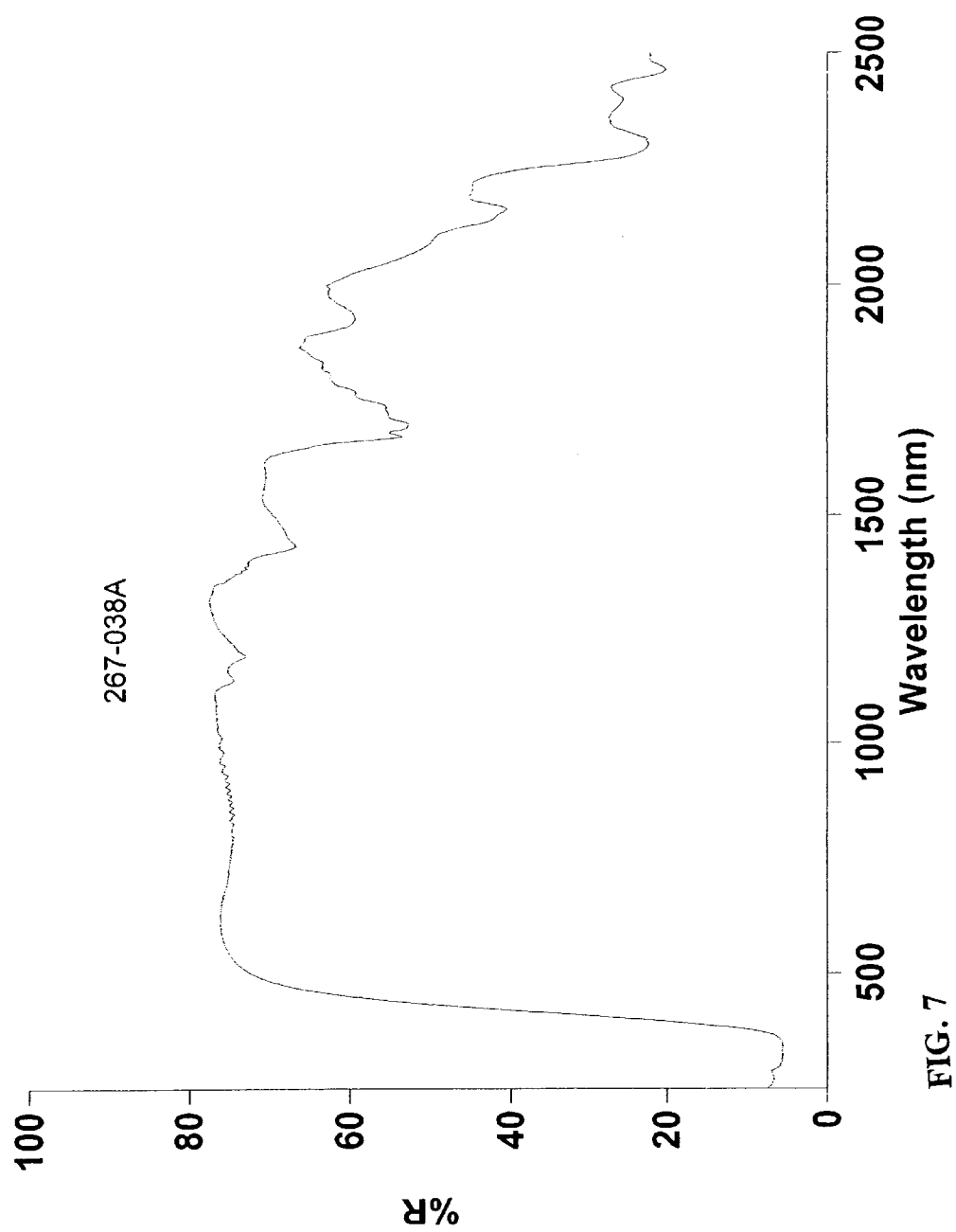
Figure 8:
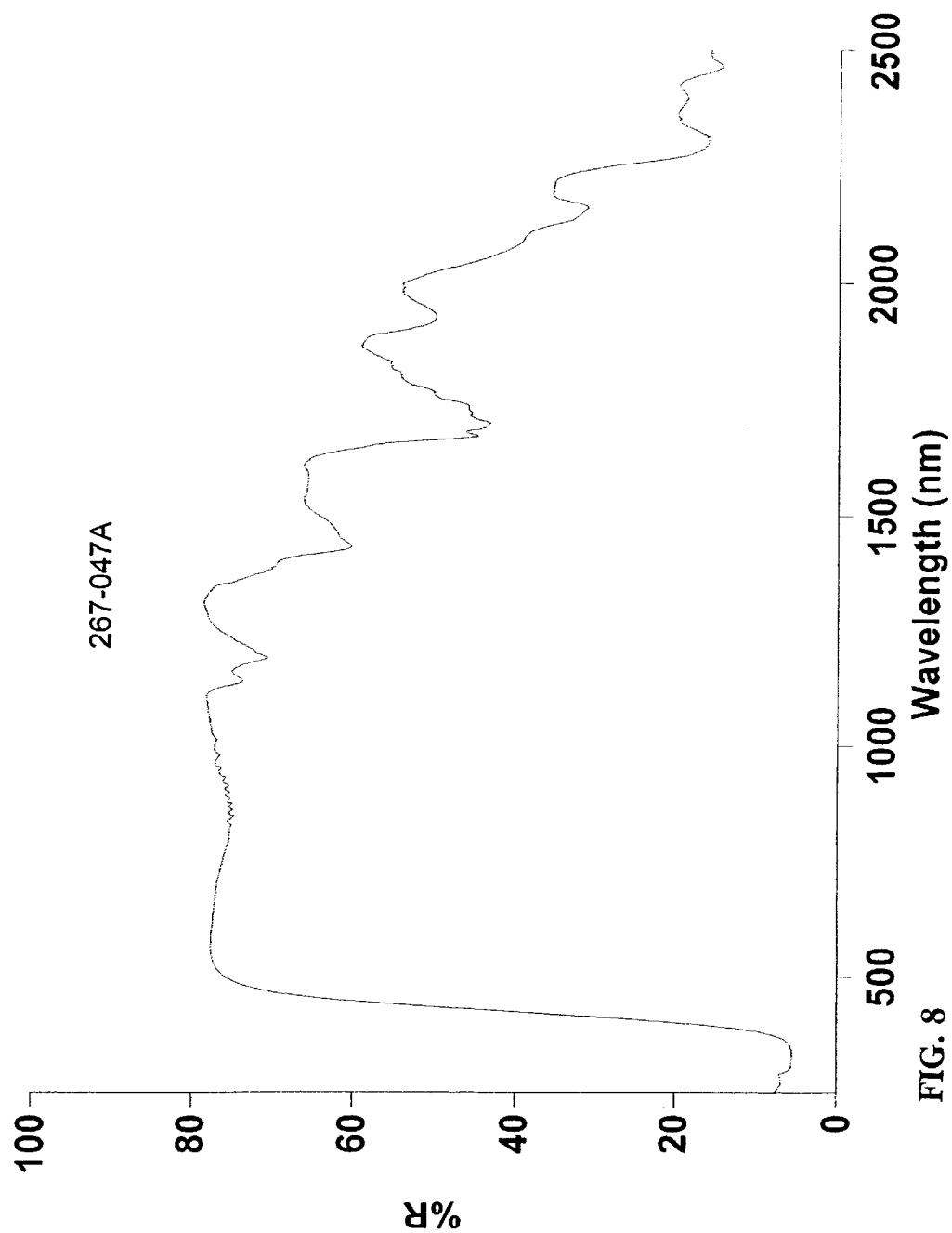
Figure 9:
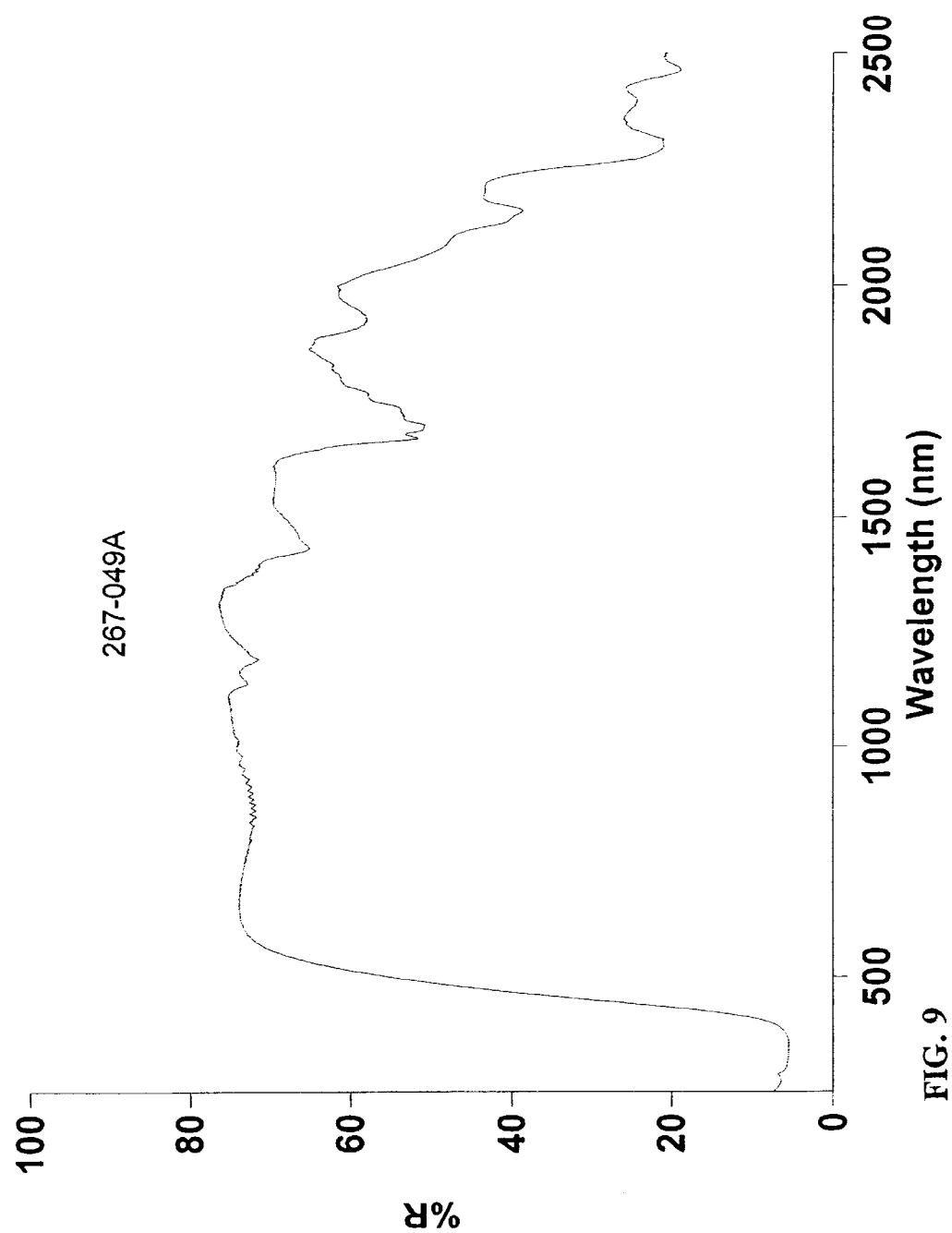
Figure 10:
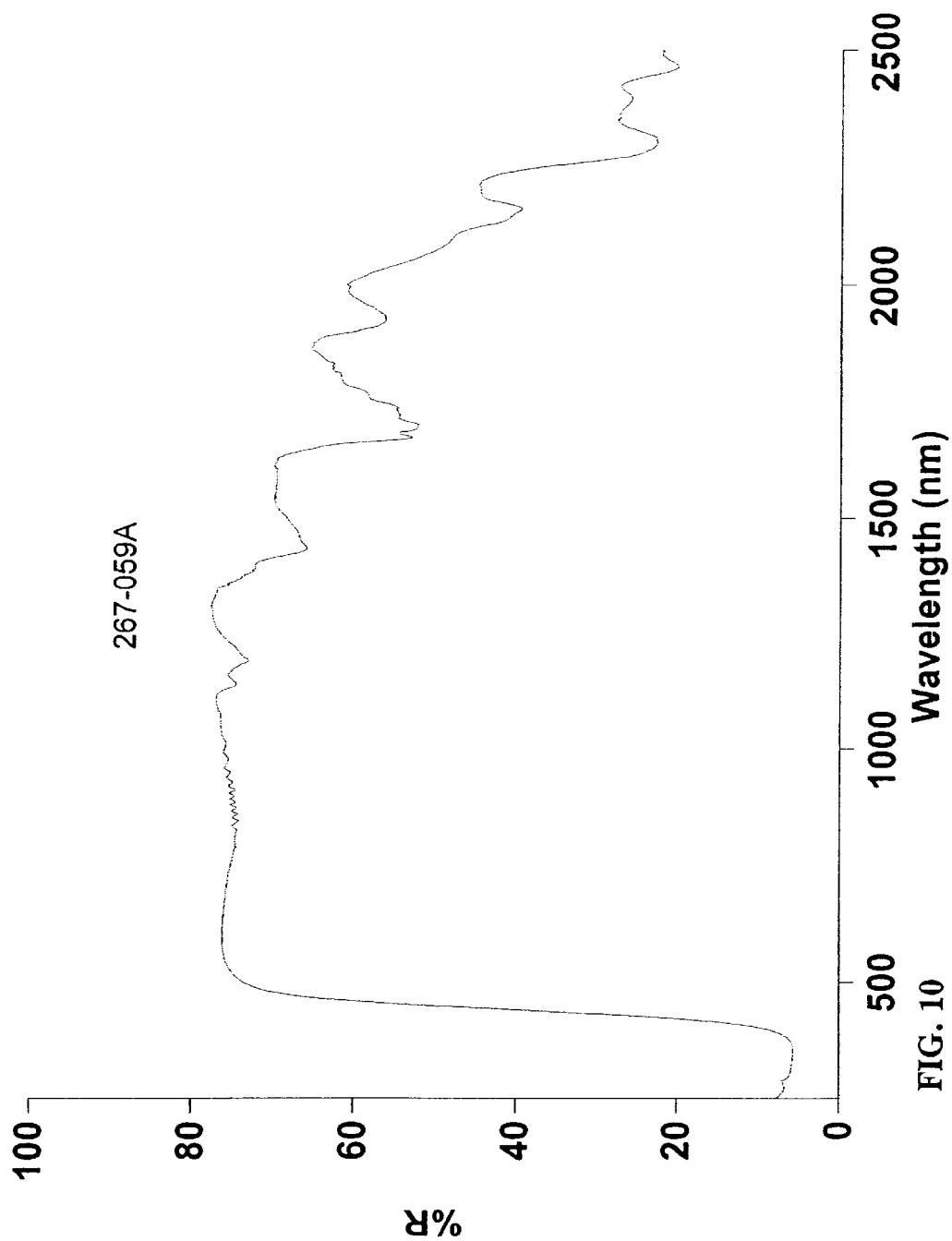
Figure 11:
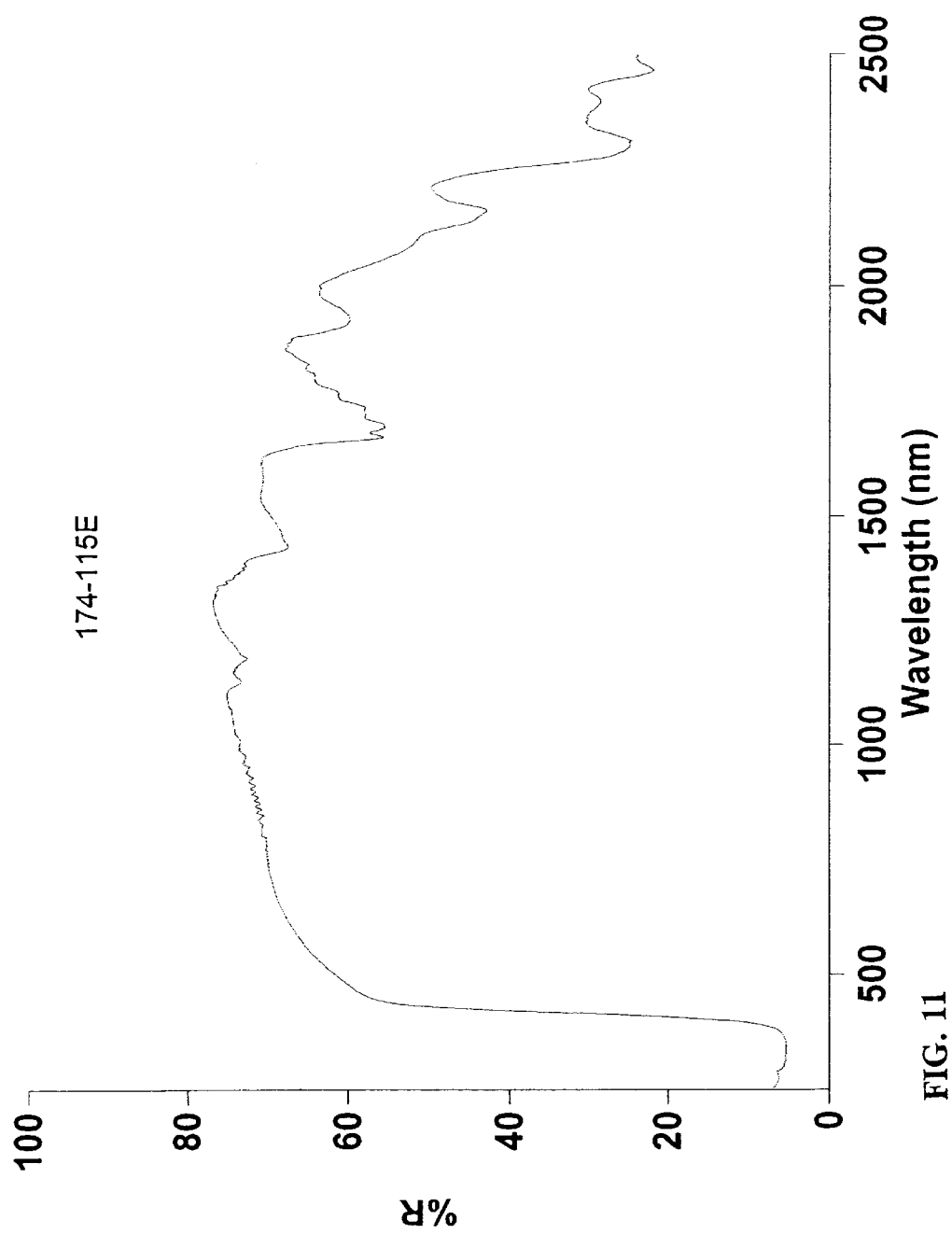

FIGS. 1a and 1b schematically illustrate a laser marking operation in accordance with an embodiment of the invention. A substrate 10 includes particles 12 of the present bismuth-containing compounds dispersed therein. As illustrated in FIG. 1b, a portion 14 of the substrate 10 that has been irradiated with a laser beam (not shown) appears as a marking which contrasts with the unmarked portion of the substrate. The contrasting marked portion has different visual characteristics in comparison with the rest of the substrate, e.g., a different lightness value and/or a different color value. This contrast results from the interaction of the laser beam with the bismuth-containing compound particles. While not intending to be bound by theory, upon irradiation, the particles of the laser marking compounds may interact with the laser energy by scattering, reflecting or absorbing the energy, and a chemical reaction may occur with the substrate material, e.g., paint or plastic material matrix. The reactions may occur under reducing conditions such that the bismuth-containing compounds change to a state of reduced oxygen content.

As used herein, the term "laser markable compound" means a compound that can be dispersed in a substrate and provide a contrasting mark on the substrate after the region has been irradiated by a laser. The resultant marked region contrasts with the non-irradiated region, e.g., the marking may have a different lightness value and/or color value compared with the non-irradiated region. For example, the laser markable compounds preferably provide contrasting marks having different lightness values $\Delta L$ as determined by the standard CIELAB scale. The difference in lightness values $\Delta L$ between the marked and unmarked regions typically has an absolute value of greater than about 10. Preferably, the absolute value of $\Delta L$ is greater than about 20, more preferably greater than about 25. In a particularly preferred embodiment, the absolute value of $\Delta L$ is about 30 or higher.

The term "substrate" as used herein means any material in which the present bismuth-containing compounds may be incorporated, including coatings and bulk materials in various forms. The bismuth-containing compounds may be dispersed homogeneously or non-homogeneously in the substrate.

The present laser markable compounds comprise Bi and at least one additional metal. Preferably, the compounds are oxides of Bi and the additional metal(s), but may alternatively comprise oxide-free compounds, hydrates, carbonates, sulfates, sulfides or other compounds containing the bismuth and additional metal(s). The additional metals are preferably Zn, Ti, Fe, Cu, Al, Zr, P, Sn, Sr, Si, Y, Nb, La, Ta, Pr, Ca, Mg, Mo, W, Sb, Cr, Ba and Ce.

Preferred laser markable bismuth-containing oxide compounds of the present invention are of the formula $Bi_xM_yO_z$, where M is at least one metal selected from Zn, Ti, Fe, Cu, Al, Zr, P, Sn, Sr, Si, Y, Nb, La, Ta, Pr, Ca, Mg, Mo, W, Sb, Cr, Ba and Ce. Particularly preferred metals include Zn, Si, Zr, Al and Sn. In this formula, x is from about 0.3 to about 70, y is from about 0.05 to about 8, and z is from about 1 to about 100. More preferably, x is from about 2 to about 64, y is from about 0.3 to about 4, and z is from about 2 to about 98. For laser marking contrast, it has been found that higher bismuth content tends to result in higher contrast of the mark. Preferred ratios of x/y are greater than 2 or 3. More preferred ratios of x/y are greater than about 5 or 10, more preferably greater than about 20. The bismuth-containing compounds are typically provided in particulate form having average particle sizes from about 0.5 to about 40 micron, preferably from about 0.8 to about 4 micron.

The bismuth-containing compounds are provided in the substrate in sufficient amounts to provide laser marks of sufficient contrast. Furthermore, the compounds may be provided in sufficient amounts for coloring purposes. The bismuth-containing compounds preferably comprise from about 0.1 to about 70 weight percent of the substrate, more preferably from about 2 to about 50 weight percent.

In accordance with an embodiment of the present invention, the laser markable compounds are selected such that they exhibit sufficiently high contrast laser marking qualities. The present compounds are preferably formed by high temperature reaction of bismuth oxide and other metal oxide(s). The unique compounds are then used as a pigment type material in the substrate, e.g., paints and plastics. By addition of these pre-reacted unique chemical structures to the substrate compositions, the laser marking contrast properties are greatly enhanced. In preferred embodiments, the heat build-up is also greatly reduced due to unique IR reflecting properties, and electronic properties may be improved.

The bismuth-containing laser markable compounds may be made by mixing Bi metal oxides and additional metal oxides or precursors thereof, such as nitrates, carbonates, sulfates, etc, and heating the mixture and grinding the materials. Other methods of making the laser markable compounds include wet chemical precipitation reactions, sol gel reaction, and vapor phase reactions to make the compounds or coatings on the surfaces of the compounds.

Various methods may be used to disperse the bismuth-containing laser markable compound into the substrate. For example, paints may be made by conventional mixing operations using cowles, horizontal mills, bead mills, shakers, attritors and the like. The bismuth-containing compounds may be mixed into plastic and other substrates using conventional extruders, molding equipment, brabenders and the like.

Uses of the present bismuth-containing laser markable compounds include many applications such as plastic and paint applications for the automotive, architectural and electronics industries, and other industrial and military applications. One of the unique properties of coatings which include the present bismuth-based materials is the ability to produce high contrast marks upon irradiation by a laser beam. Use of the present compounds in combination with, e.g., paint and plastic chemistries allows for extremely high contrast marks to be formed by the laser. These marks can be used for decorative or identification purposes.

Plastic or rubber substrate compositions that can be colored and marked according to this invention are based upon polymeric materials that can be natural or synthetic. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produced by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methyacrylic acid esters, butadiene, as well as co polymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for laquers, paints, or printing inks such as linseed oil, nitrocellulose, melamine resins, acrylic resins, ureaformaldehyde resins and the like. The pigmentary use of the present bismuth-containing compounds in other coatings or materials such as carbon-carbon composites may also provide advantages with regard to IR reflection. Also a plastic body as a substrate which would contain the pigment (such as vinyl siding) and/or any substrate (glass, ceramic, metal, plastic, composite) having thereon an organic coating or paint which would contain and utilize the high contrast laser markability, electronic properties, or low heat build-up properties of the bismuth containing pigments.

Another use of the present bismuth-containing compounds is in glass-ceramic enamels for applications such as colored borders around glass sheets used for automobiles to enhance appearance and to prevent UV degradation of underlying adhesives. Architectural, container and other glass or ceramic decorative applications where the compounds are stable and can impart desirable property improvements are also possible in accordance with the present invention.

Glass-ceramic enamel compositions may comprise from 1 to 70 wt % of the bismuth-containing compounds, such as $ZnBi_{38}O_{60}$, and from 30 to 99 wt % solid glass frit compositions, or a combination of two or more frits. Additional oxide pigments may be added to the enamel compositions such as $CuCr_2O_4$,$(CO,Fe)(Fe,Cr)_2O_4$ and the like. Printable enamel paste may be made from 60 to 85 wt % of above solids power, plus 15 to 40 wt % of a suitable carrying vehicle or medium which can be, e.g., screen printed, roll coated or sprayed. Such glass-ceramic enamels may be applied to automotive glass substrates, architectural glass substrates, container glass substrates, and/or metal substrates.

The following examples are intended to illustrate various aspects of the invention, and are not intended to limit the scope of the invention.

Bismuth Titanate Compounds

A sample designated 267–010a was made from 59.3 g $Bi_2O_3$ and 40.7 g $TiO_2$. The powders were mixed together and heated at 2,110° F. for eight hours. The sample was ground into a fine powder which had an off white or pastel yellow color. X-ray diffraction identified $Bi_2Ti_4O_{11}$ as the main crystalline phase.

A sample designated 267–011a was made from 79.5 g $Bi_2O_3$ and 20.5 g $TiO_2$. The powders were mixed together and heated at 2,110° F. for eight hours. The sample was ground into a fine powder which had an off white color. X-ray diffraction identified $Bi_4Ti_3O_{12}$ as the main crystalline phase.

A sample designated 267–012b was made from 98.31 g $Bi_2O_3$ and 1.69 g $TiO_2$. The powders were mixed together and melted at 1832° F. for ten minutes, and then poured into water. The sample was ground into a fine powder which had an off white color. X-ray diffraction identified $Bi_{12}TiO_{20}$ as the main crystalline phase.

A sample designated 267–013a was made from 97.2 g $Bi_2O_3$ and 2.8 g $TiO_2$. The powders were mixed together and melted in a crucible at 1,832° F. for ten minutes and then poured into a water bath. The sample was ground into a fine powder which had a pastel yellow color. X-ray diffraction identified $Bi_{12}TiO_{20}$ as the main crystalline phase.

Additional bismuth titanate compounds for high contrast laser marking may include $Bi_8TiO_{14}$, $Bi_2Ti_2O_7$, $Bi_{20}TiO_{32}$ and other crystalline, partially crystalline and amorphous compounds.

Bismuth Ferrite Compounds

A sample designated 267–016b was made from 97.2 g $Bi_2O_3$ and 2.8 g $Fe_2O_3$. The powders were mixed together and melted in a crucible at 1,652° F. for 10 minutes, 1,832° F. for ten minutes, and then poured into a water bath. The sample was ground into a fine powder which had a yellow-orange color. X-ray diffraction identified only an amorphous phase present.

Additional bismuth ferrite compounds for high contrast laser marking may include $Bi_2Fe_4O_9$, $BiFeO_3$, $Bi_{3.43}Fe_{0.57}O_6$, $Bi_{24}Fe_2O_{39}$, $Bi_{25}FeO_{40}$, $Bi_{46}Fe_2O_{72}$, $Bi_{36}Fe_2O_{57}$ and other crystalline, partially crystalline and amorphous compounds.

Bismuth Aluminate Compounds

A sample designated 267–022a was made from 99.1 g $Bi_2O_3$ and 0.9 g $Al_2O_3$. The powders were mixed together and melted in a crucible at 1,832° F. for ten minutes, and then poured into a water bath. The sample was ground into a fine powder which had a light yellow color. X-ray diffraction identified $Bi_2O_3$ and $Bi_{24}Al_2O_{39}$ phases present.

Additional bismuth aluminate compounds for high contrast laser marking may include $AlBiO_3$, $Al_4Bi_2O_9$, $Bi_{48}Al_2O_{75}$ and other crystalline, partially crystalline and amorphous compounds.

Bismuth Zirconate Compounds

A sample designated 267–024a was made from 95.7 g $Bi_2O_3$ and 4.3 g $ZrO_2$. The powders were mixed together and melted in a crucible at 1,832° F. for ten minutes, and then poured into a water bath. The sample was ground into a fine powder which had a yellow-orange color. X-ray diffraction identified $Bi_2O_3$, $ZrO_2$ and $Bi_{24}Al_2O_{39}$ phases present.

A sample designated 267–024b was made from 54.0 g $Bi_2O_3$ and 46.0 g $ZrO_2$. The powders were mixed together and heated on a mullite plate at 1,652° F. for seven hours. The sample was ground into a fine powder which had a yellow-orange-tan color. X-ray diffraction identified $Bi_2O_3$, $ZrO_2$, $Bi_{12}SiO_{20}$ and $SiO_2$ phases present. Based on stochiometry, the expected phase is $Bi_2Zr_3O_9$. However, this phase is not in the xrd computer database.

A sample designated 267–024c was made from 71.6 g $Bi_2O_3$ and 28.4 g $ZrO_2$. The powders were mixed together and heated on a mullite plate at 1,652° F. for seven hours. The sample was ground into a fine powder which had a yellow-orange color. X-ray diffraction identified $Bi_2O_3$, $ZrO_2$ and $Bi_{12}SiO_{20}$ phases present. Based on stochiometry, the expected phase is $Bi_4Zr_3O_{12}$. However, this phase is not in the xrd computer database.

Other bismuth zirconate crystalline, partially crystalline and amorphous compounds could be included for high contrast laser marking applications.

Bismuth Phosphate Compounds

Bismuth phosphate compounds for high contrast laser marking may include $BiP_5O_{14}$, $Bi(PO_3)_3$, $BiPO_4$, $Bi_2P_4O_{13}$, $Bi_4P_2O_{11}$, $Bi_3PO_7$, $Bi_5PO_{10}$, $Bi_{12}P_2O_{23}$, $Bi_{23}P_4O_{44.5}$, $Bi_{3.69}P_{0.31}O_{6.31}$, $Bi_{7.68}P_{0.32}O_{12.32}$ and other crystalline, partially crystalline, and amorphous compounds.

Bismuth Stannate Compounds

A sample designated 267–036a was made from 50.8 g $Bi_2O_3$ and 49.2 g $SnO_2$. The powders were ground together in water for 1.5 hour to mix thoroughly, and then dried at 220° F. Powders were heated together at 1,958° F. for seven hours. The sample was ground into a fine powder which had a tannish off-white color. X-ray diffraction identified $Bi_2Sn_2O_7$ and $SnO_2$ phases present.

A sample designated 267–038a was made from 99.0 g $Bi_2O_3$ and 1.0 g $SnO_2$. The powders were mixed together and melted in a crucible at 1,832° F. for twenty minutes, and then poured into a water bath. The sample was ground into a fine powder which had an orange-yellow color. X-ray diffraction identified $Bi_{12}SiO_{20}$ and $SiO_2$ phases present.

Additional bismuth stannate compounds for high contrast laser marking may also include $Bi_2Sn_3O_9$, $Bi_{12}SnO_{20}$, $Bi_{3.94}Sn_{0.06}O_{6.02}$, $Bi_{64}SnO_{98}$, $Bi_7Sn_{0.1}O_{10.7}$ and other crystalline, partially crystalline and amorphous compounds.

Strontium Bismuth Oxide Compounds

A sample designated 267–047a was made from 87.1 g $Bi_2O_3$ and 12.9 g $SrCO_3$. The powders were mixed together and melted in a crucible at 1,832° F. for ten minutes, 2,000° F. for ten minutes, 2,100° F. for one minute, and then poured into a water bath. The sample was ground into a fine powder which had an yellow color. X-ray diffraction identified crystalline $Bi_2O_3$ and $SrSiO_3$ phases present, and an amorphous phase present.

Additional strontium bismuth oxide compounds for high contrast laser marking may include $Sr_6Bi_2O_9$, $Sr_3Bi_2O_6$, $Sr_2Bi_2O_5$, $Sr_3BiO_{5.4}$, $Sr_3BiO_2$, $Sr_{1.5}Bi_{0.5}O_{2.75}$, $Sr_{1.2}Bi_{0.8}O_3$, $Sr_{0.9}Bi_{1.1}O_{2.55}$, $Sr_3Bi_4O_9$, $Sr_{0.74}Bi_{1.26}O_{2.63}$, $SrBi_2O_4$, $Sr_{2.25}Bi_{6.75}O_{12.38}$, $SrBi_4O_7$, $Sr_{0.19}Bi_{0.81}O_{1.4}$, $Sr_{0.16}Bi_{3.84}O_{5.92}$ and other crystalline, partially crystalline and amorphous compounds.

Yittrium Bismuth Oxide Compounds

A sample designated 267–049a was made from 83.8 g $Bi_2O_3$ and 16.2 g $Y_2O_3$. The powders were mixed together and melted in a crucible at 1,832° F. for ten minutes and then 2,200° F. for ten minutes. The sample was ground into a fine powder which had an orangish yellow color. X-ray diffraction identified crystalline $Y_{0.285}Bi_{0.715}O_{1.5}$ and $Bi_2O_3$ phases present.

Additional yttrium bismuth oxide compounds for high contrast laser marking include $BiYO_3$, $Bi_{1.5}Y_{0.5}O_3$, $Bi_{0.67}Y_{0.33}O_{1.5}$, $Bi_{1.55}Y_{0.45}O_3$, $Bi_{1.87}Y_{0.13}O_3$, $Bi_{1.9}Y_{0.1}O_3$, $Bi_{19}YO_{30}$ and other crystalline, partially crystalline and amorphous compounds.

Bismuth Niobate Compounds

A sample designated 267–059a was made from 98.8 g $Bi_2O_3$ and 1.2 g $Nb_2O_5$. The powders were mixed thoroughly together and heated in a crucible at 1,832° F. for ten minutes, 2,000° F. for ten minutes, and then water quenched. The sample was ground into a fine powder which had a slight orange color. X-ray diffraction identified crystalline $Bi_{5.6}Si_{0.5}O_{9.4}$, $Bi_2O_3$ and/or $BiO$ phases as possibly being present.

Additional bismuth niobate compounds for high contrast laser marking may include $Bi_3Nb_{17}O_{47}$, $Bi_2Nb_{10}O_{28}$, $Bi_8Nb_{18}O_{57}$, $BiNbO_4$, $Bi_5Nb_3O_{15}$, $Bi_{1.70}Nb_{0.30}O_{3.30}$, $Bi_{12}Nb_{0.29}O_{18.7}$, $Bi_{7.84}Nb_{0.16}O_{12.16}$ and other crystalline, partially crystalline and amorphous compounds.

Bismuth Lanthanum Oxide Compounds

A sample designated 267–063a was made from 48.8 g $Bi_2O_3$ and 51.2 g $La_2O_3$. The powders were mixed thoroughly by wet milling together in an alumina mill and media and then dried at 220° F. The sample was heated on a mullite plate at 1,742° F. for twenty four hours and then air quenched. The sample was ground into a fine powder which had a yellow orange color. X-ray diffraction identified crystalline $BiLa_2O_{4.5}$ and $Bi_8La_{10}O_{27}$ phases as being present.

Additional bismuth lanthanum oxide compounds for high contrast laser marking may include $Bi_{0.92}La_{1.08}O_{3.03}$, $Bi_{0.4}La_{0.6}O_{1.5}$, $BiLa_2O_{4.5}$ and other crystalline, partially crystalline and amorphous compounds.

Bismuth Tantalum Oxide Compounds

A sample designated 267–064a was made from 97.6 g $Bi_2O_3$ and 2.4 g $Ta_2O_5$. The powders were mixed thoroughly by wet milling together in an alumina mill and media and then dried at 220° F. The sample was heated on a mullite plate at 1,418° F. for twenty-four hours and then air quenched. The sample was ground into a fine powder which had a yellow orange color. X-ray diffraction identified crystalline $Bi_{7.8}Ta_{0.2}O_{12.20}$ as a major phase and $Bi_2O_3$, $Bi_{24}Al_2O_{39}$ and $SiO_2$ minor phases as being present.

Additional bismuth tantalum oxide compounds for high contrast laser marking may include $Bi_{3.0}TaO_{7.0}$, $BiTaO_4$, $BiTa_7O_{19}$ and other crystalline, partially crystalline and amorphous compounds.

Bismuth Praseodymium Oxide Compounds

A sample designated 267–068a was made from 74.6 g $Bi_2O_3$ and 25.4 g $Pr_2O_3$. The powders were mixed thoroughly and then heated on a mullite plate at 1,565° F. for five hours and then quenched in liquid nitrogen. The sample was ground into a fine powder which had a yellow green color. X-ray diffraction identified crystalline $Bi_{1.35}Pr_{0.65}O_3$ as a major phase and $Bi_2O_3$ and $SiO_2$ minor phases as being present.

A sample designated 267–068b was made from 94.7 g $Bi_2O_3$ and 5.3 g $Pr_2O_3$. The powders were mixed thoroughly and then heated on a mullite plate at 1,490° F. for five hours and then quenched in liquid nitrogen. The sample was ground into a fine powder which had a yellowish tan color. X-ray diffraction identified crystalline $Bi_{1.854}Pr_{0.146}O_3$ as a major phase and $Bi_2O_3$ and $Bi_{12}SiO_{20}$ minor phases as being present.

A sample designated 267–069a was made from 96.5 g $Bi_2O_3$ and 3.5 g $Pr_2O_3$. The powders were mixed thoroughly and then heated on a mullite plate at 1,454° F. for five hours and then quenched in liquid nitrogen. The sample was ground into a fine powder which had a yellowish tan color. X-ray diffraction identified crystalline $Bi_{1.904}Pr_{0.096}O_3$ as a major phase and $Bi_2O_3$ and $Bi_{12}SiO_{20}$ minor phases as being present.

Additional bismuth praseodymium oxide compounds for high contrast laser marking may include other crystalline, partially crystalline, and amorphous compounds.

Bismuth Calcium Oxide Compounds

A sample designated 267–075a was made from 90.3 g $Bi_2O_3$ and 9.7 g $CaCO_3$. The powders were mixed thoroughly and the sample was heated on a mullite plate at 1,562° F. for seven hours and then air quenched. The sample was ground into a fine powder which had a yellow orange-brown color. X-ray diffraction identified $Bi_2O_3$, $Bi_{24}Al_2O_{39}$, $Ca(OH)_2$ and $Bi_{1.6}Ca_{0.4}O_{2.8}$ phases as being present.

Additional bismuth calcium oxide compounds for high contrast laser marking may include $Bi_6Ca_7O_{16}$, $Bi_2Ca_2O_5$, $Bi_{1.09}Ca_{0.91}O_{2.55}$, $Bi_{10}Ca_7O_{22}$, $Bi_6Ca_4O_{13}$, $Bi_2CaO_4$, $Bi_{14}Ca_5O_{26}$, $Bi_{3.11}Ca_{0.89}O_{5.56}$, $Bi_{1.6}Ca_{0.4}O_{2.8}$ and other crystalline, partially crystalline and amorphous compounds.

Bismuth Zinc Oxide Compounds

A sample designated 174–115e was made from 97.7 g $Bi_2O_3$ and 2.3 g $ZnO$. The powders were mixed thoroughly and the sample was heated in a cordierite sagger at 1,380° F. for sixty-five hours. The sample was ground into a fine powder which had an off white color. X-ray diffraction identified the $ZnBi_{38}O_{60}$ phase as being present.

Additional bismuth zinc oxide compounds for high contrast laser marking may include $Bi_{48}ZnO_{73}$, $Bi_{7.65}Zn_{0.35}O_{11.83}$, $BiZn_{38}O_{58}$ and other crystalline, partially crystalline and amorphous compounds.

Bismuth Silicate Compounds

A sample designated 174–115c was made from 97.9 g $Bi_2O_3$ and 2.1 g $SiO_2$. The powders were mixed thoroughly and the sample was heated in a cordierite sagger at 1,530° F. for fourteen hours. The sample was ground into a fine powder which had an off white color. X-ray diffraction identified $Bi_{12}SiO_{20}$, $Bi_2O_3$ and $Bi_2SiO_5$ phases as being present.

Additional bismuth silicate compounds for high contrast laser marking may include $Bi_4Si_3O_{12}$ and other crystalline, partially crystalline and amorphous compounds.

In addition to the above-noted compounds, bismuth cuprate compounds for high contrast laser marking may include $Bi_2CuO_4$ and other crystalline, partially crystalline and amorphous compounds.

Alternatively, bismuth magnesium oxide compounds for high contrast laser marking may include $Bi_{12}MgO_{19}$, $Bi_{18}Mg_8O_{36}$ and other crystalline, partially crystalline and amorphous compounds.

Bismuth-containing compounds, such as those described in the preceding examples, may be used in accordance with the present invention to produce laser marks on or in various types of substrates. A selected portion of the substrate comprising the bismuth-containing compound is irradiated with a beam to form a permanent marking therein or thereon. For many types of markings, the irradiated portion of the substrate surface may comprise from about 0.1 to about 99 percent of the total surface area of the substrate, typically from about 1 to about 95 percent. A laser is preferably used to selectively irradiate the substrate. However, other forms of focused energy may be used in accordance with the present invention. Irradiation may be achieved by moving a laser beam over a stationary substrate using conventional beam steering methods, by moving the substrate in relation to the laser beam and/or by masking the substrate. Laser irradiation is typically achieved by directing the beam directly against the surface of the substrate to be marked, but may also be achieved by directing the beam through the rear side of a sufficiently transparent substrate.

Suitable lasers for use in accordance with the present invention include neodymium:yttrium aluminum garnet (Nd:YAG) lasers, carbon dioxide ($CO_2$) lasers, diode lasers, excimer lasers and the like.

Typical YAG lasers emit light in the near-infrared spectrum at wavelengths of 1064 nm. Such lasers typically have continuous power outputs of from about 1 to about 50 watts, and can be operated in a pulsed mode at typical peak powers of from about 1 watt to about 45 kilowatts. For pulsed mode operation, frequencies of from about 1 to about 64,000 pulses/second may be used.

Typical $CO_2$ lasers emit light in the far-infrared region of the spectrum, with intensity spikes at wavelengths of 9.8 and 10.6 microns. Such $CO_2$ lasers typically operate at a continuous output power of from about 1 to about 40 watts.

In accordance with the present invention, the size of the laser spot that impinges the substrate is typically greater than 0.1 micron in diameter, preferably from about 40 to about 500 microns, and more preferably from about 50 to about 125 microns. The speed at which the laser beam travels across the surface of the substrate preferably ranges from 0 to about 100 inches/second (up to about 250 cm/second), more preferably from about 1 or 2 to about 20 inches/second (about 2.5 or 5 to 50 cm/second) for most thicknesses and compositions. The laser beam may be projected with a seam overlap of 0 to 100 percent, preferably from about 10 to about 90 percent for many applications. The laser parameters are controlled in order to provide sufficient localized heating of the bismuth-containing compound, while avoiding unwanted damage to the substrate.

The laser beam, the movement of which can be controlled by a computer, may be used to create discrete symbols or designs or, alternatively, may be serially indexed across the surface of the substrate to create multiple symbols or designs at the same time. For example, a word may be created by separately making each letter of the word with the laser, or by rastering the laser across the entire word to form all of the letters at the same time. A single laser beam may be used for marking in accordance with the present invention. Alternatively, two or more laser beams may be used.

During the irradiation step, the surface of the substrate may be exposed to any desired type of atmosphere. For example, the atmosphere may comprise air at atmospheric, sub-atmospheric or super-atmospheric pressures. Furthermore, the atmosphere may comprise an inert gas such as nitrogen, argon or carbon dioxide, an oxidizing atmosphere such as air or oxygen, a reducing atmosphere such as hydrogen or carbon monoxide, or a vacuum. Oxidizing or reducing gases can be used in a combination with inert gases.

Laser marking tests were performed using several bismuth-containing compounds of the present invention. The following application and laser marking procedures were used in laser marking tests.

Epoxy Coating Test

Waterbased epoxy (Sherwin Williams Hydralon B)—50 g
Bismuth-containing pigment—10 g
Defoamer (Byk 023)—0.05 g
Glass beads—50 g
Shake for 30 minutes; filter the dispersion; add one part hardener (Sherwin Williams KEM Aqua Hydralon B) to 2 parts of the dispersion; produce a film with the finished paint on an aluminum panel and let air dry overnight; mark the film surface with YAG or $CO_2$ laser to produce high contrast marks; and measure the contrast between the unmarked and marked surfaces with a spectrophotometer.

Plastic Test

Thermoplastic polyurethane resin (Bayer 795 U)—195 g
Bismuth-containing pigment—5 g
Shake for 2 minutes; injection mold the samples with a standard injection molding machine at 395° F. into color chips; mark the chips with YAG or $CO_2$ laser to produce high contrast marks; and measure the contrast between the unmarked and marked surfaces with a spectrophotometer.

For YAG laser marking, the following parameters were used: 10,000 pulses/second; 20 inches per second; 32 amps power; 0.005 dot size; and 40 percent seam overlap. For $CO_2$ laser marking, the following parameters were used: 50 percent of 35 watt power; 36 inches/minute; and 500 dpi.

Table 1 lists the color values of each epoxy coating sample before and after laser marking. The standard CIELAB L*a*b* system was used to define the color of the samples. The L* value refers to the lightness of the sample, with L*=100 designating the lightness upper limit and L*=0 designating the darkness lower limit. The a* value describes the red or green value of the pigment, with a positive a* value designating red, and a negative a* value designating green. The b* value represents the blue or yellow value, with a positive b* value designating yellow and a negative b* value designating blue. The ΔL*, Δa* and Δb* values represent the difference in the L*, a* and b* values between the unmarked and marked samples. The ΔE* values are a measure of the combined difference in lightness and color values between the unmarked and marked samples.

TABLE 1

Epoxy Coating Laser Mark Contrast

| Sample ID | L* | a* | b* | ΔL* | Δa* | Δb* | ΔE* |
|---|---|---|---|---|---|---|---|
| White 267-010A | 87.88 | −0.36 | 4.38 | | | | |
| 267-010A Marked | 62.45 | 1.51 | 6.39 | −25.43 | 1.87 | 2.00 | 25.58 |

TABLE 1-continued

Epoxy Coating Laser Mark Contrast

| Sample ID | L* | a* | b* | ΔL* | Δa* | Δb* | ΔE* |
|---|---|---|---|---|---|---|---|
| White 267-010A' | 89.99 | −0.22 | 4.40 | | | | |
| 267-010A' Marked | 63.86 | 1.46 | 6.22 | −26.13 | 1.67 | 1.82 | 26.25 |
| White 267-011A | 87.87 | −0.97 | 7.89 | | | | |
| 267-011A Marked | 60.66 | 1.71 | 7.45 | −27.21 | 2.68 | −0.44 | 27.35 |
| Light Yellow 267-12B | 86.24 | −5.59 | 18.96 | | | | |
| 267-12B Marked | 53.42 | 2.07 | 9.08 | −32.82 | 7.67 | −9.87 | 35.12 |
| Light Yellow 267-013A | 88.25 | −5.52 | 23.19 | | | | |
| 267-013A Marked | 54.20 | 1.86 | 9.64 | −34.05 | 7.37 | −13.56 | 37.38 |
| Yellow 267-016B | 77.48 | 2.78 | 46.39 | | | | |
| 267-016B Marked | 53.73 | 2.03 | 21.98 | −23.76 | −0.76 | −24.41 | 34.07 |
| Yellow 267-022A | 85.76 | −7.82 | 21.46 | | | | |
| 267-022A Marked | 58.75 | −1.66 | 14.00 | −27.01 | 6.15 | −7.46 | 28.69 |
| Yellow 267-024A | 86.37 | −6.44 | 38.04 | | | | |
| 267-024A Marked | 47.96 | 1.57 | 13.03 | −38.41 | 8.01 | −25.01 | 46.53 |
| Light Yellow 267-038A | 87.57 | −3.30 | 13.46 | | | | |
| 267-038A Marked | 57.84 | 1.36 | 9.28 | −29.72 | 4.66 | −4.17 | 30.38 |
| Light Yellow 267-047A | 89.05 | −5.66 | 13.68 | | | | |
| 267-047A Marked | 53.03 | 2.07 | 6.73 | −36.02 | 7.73 | −6.96 | 37.49 |
| Yellow 267-049A | 84.46 | −5.38 | 36.02 | | | | |
| 267-049A Marked | 60.62 | −1.19 | 19.56 | −23.84 | 4.19 | −16.45 | 29.27 |
| Light Yellow 267-059A | 87.99 | −8.25 | 22.84 | | | | |
| 267-059A Marked | 52.12 | 0.01 | 11.73 | −35.87 | 8.26 | −11.11 | 38.45 |
| White 174-115E | 88.80 | −2.39 | 8.38 | | | | |
| 174-115E Marked | 49.80 | 2.78 | 6.91 | −38.99 | 5.17 | −1.47 | 39.36 |
| White 174-115C | 86.34 | −1.17 | 4.38 | | | | |
| 174-115C Marked | 53.00 | 2.06 | 2.68 | −33.34 | 3.22 | −1.71 | 33.54 |
| White R960 | 95.46 | −0.99 | 2.23 | | | | |
| R960 Marked | 91.38 | −0.89 | 2.47 | −4.07 | 0.10 | 0.24 | 4.08 |

The results listed in Table 1 illustrate the high contrast between the marked and unmarked epoxy coating samples incorporating the bismuth-containing compositions, in comparison with a coating sample containing a standard $TiO_2$ pigment designated R960 in Table 1. The ΔL values from the samples comprising the present bismuth-containing compositions are over 20, and in many cases over 30.

Table 2 lists the color values of each plastic sample before and after laser marking.

TABLE 2

Plastic Laser Mark Contrast

| Sample ID | L* | a* | b* | ΔL* | Δa* | Δb* | ΔE* |
|---|---|---|---|---|---|---|---|
| 179-115E Unmarked | 81.0 | −0.75 | 11.58 | | | | |
| 179-115E Marked | 38.5 | 1.63 | 4.12 | −42.46 | 2.38 | −7.46 | 43.18 |
| 267-010A Unmarked | 84.1 | 1.03 | 9.87 | | | | |
| 267-010A Marked | 56.9 | 1.88 | 6.62 | −27.16 | 0.85 | −3.25 | 27.37 |
| 267-010A' Unmarked | 83.2 | 1.54 | 10.12 | | | | |
| 267-010A' Marked | 59.3 | 2.00 | 6.81 | −23.88 | 0.46 | −3.31 | 24.12 |
| 267-011A Unmarked | 86.7 | −0.18 | 10.78 | | | | |
| 267-011A Marked | 52.5 | 2.01 | 6.05 | −34.25 | 2.19 | −4.73 | 34.65 |
| 267-012B Unmarked | 81.5 | −3.71 | 20.64 | | | | |
| 267-012B Marked | 36.9 | 2.28 | 4.48 | −44.62 | 5.99 | −16.16 | 47.83 |
| 267-013A Unmarked | 86.1 | −5.16 | 23.18 | | | | |
| 267-013A Marked | 48.2 | 1.11 | 6.80 | −37.89 | 6.27 | −16.38 | 41.75 |
| 267-016B Unmarked | 75.9 | 4.11 | 45.11 | | | | |
| 267-016B Marked | 42.8 | 1.34 | 7.95 | −33.14 | −2.77 | −37.16 | 49.87 |
| 267-022A Unmarked | 83.3 | −5.38 | 23.76 | | | | |
| 267-022A Marked | 37.8 | 2.23 | 4.28 | −45.51 | 7.61 | −19.48 | 50.08 |
| 267-024A Unmarked | 82.9 | −4.05 | 35.10 | | | | |
| 267-024A Marked | 35.2 | 2.04 | 3.46 | −47.68 | 6.09 | −31.64 | 57.54 |
| 267-038A Unmarked | 86.0 | −2.08 | 15.55 | | | | |
| 267-038A Marked | 44.0 | 1.29 | 2.89 | −42.04 | 3.37 | −12.66 | 44.03 |
| 267-047A Unmarked | 85.8 | −3.57 | 14.99 | | | | |
| 267-047A Marked | 49.6 | 0.96 | 6.40 | −36.19 | 4.53 | −8.59 | 37.47 |
| 267-049A Unmarked | 84.6 | −3.55 | 37.92 | | | | |
| 267-049A Marked | 50.2 | −0.21 | 10.58 | −34.37 | 3.33 | −27.34 | 44.04 |
| 267059A Unmarked | 87.1 | −6.67 | 27.10 | | | | |
| 267-059A Marked | 41.8 | 1.48 | 4.40 | −45.29 | 8.15 | −22.70 | 51.31 |

The results listed in Table 2 illustrate the high contrast between the marked and unmarked plastic samples incorporating the bismuth-containing compositions. The ΔL values are greater than 20, and most are over 30 or 40.

In accordance with an embodiment of the present invention, an advantageous property of the compounds is good infrared reflectance. These infrared reflective properties were tested versus various other commercial pigments, and the measurements have shown that the present compositions exhibit low heat buildup properties. Thus, for reduced heat build-up in applications such as architectural, military, marine vessel paint, automotive paint and vinyl siding applications, the present bismuth-containing compounds have a very wide use potential.

Figure 12:
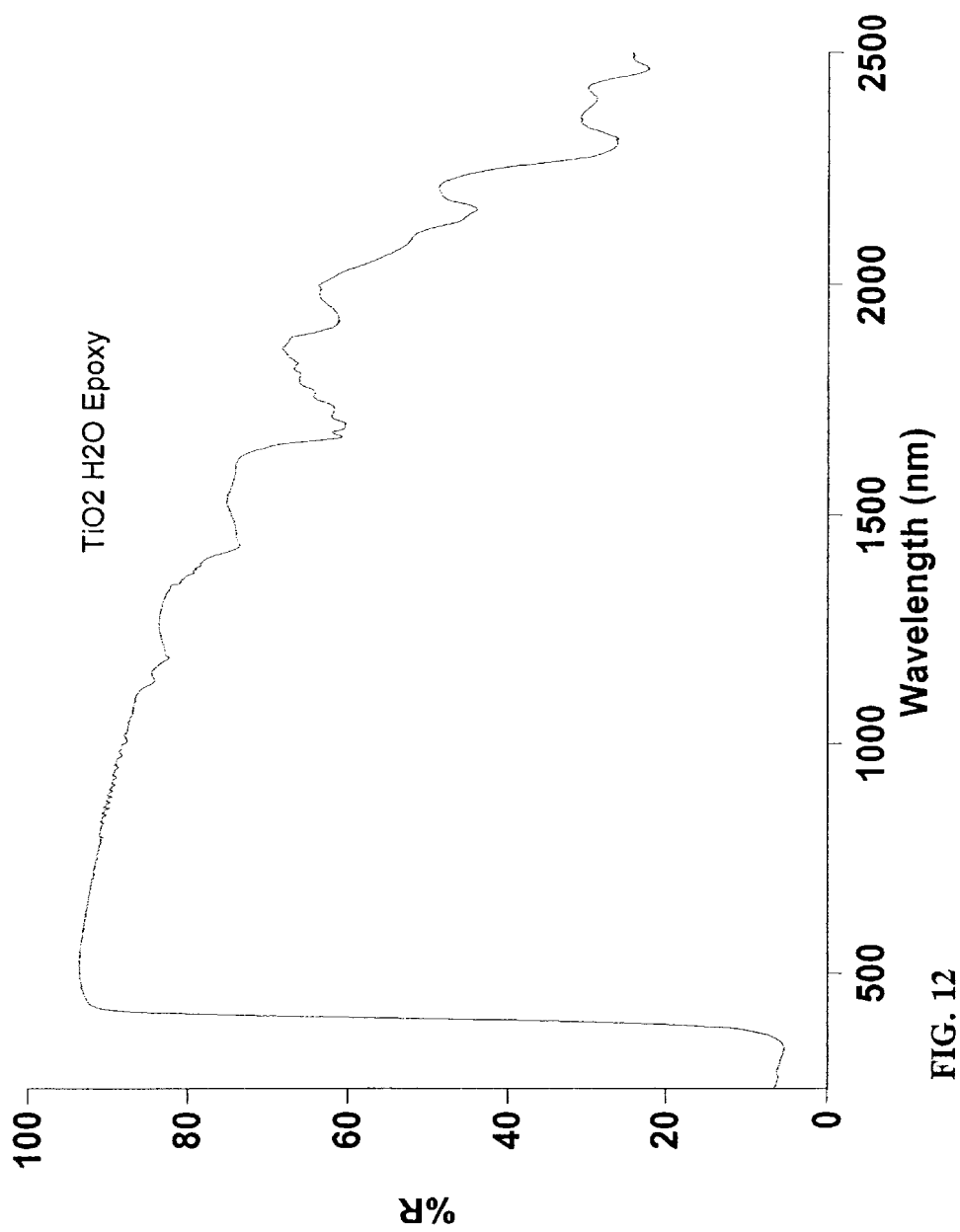
FIGS. 12–14 are graphs of reflectance versus wavelength for comparative substrates.
Figure 13:
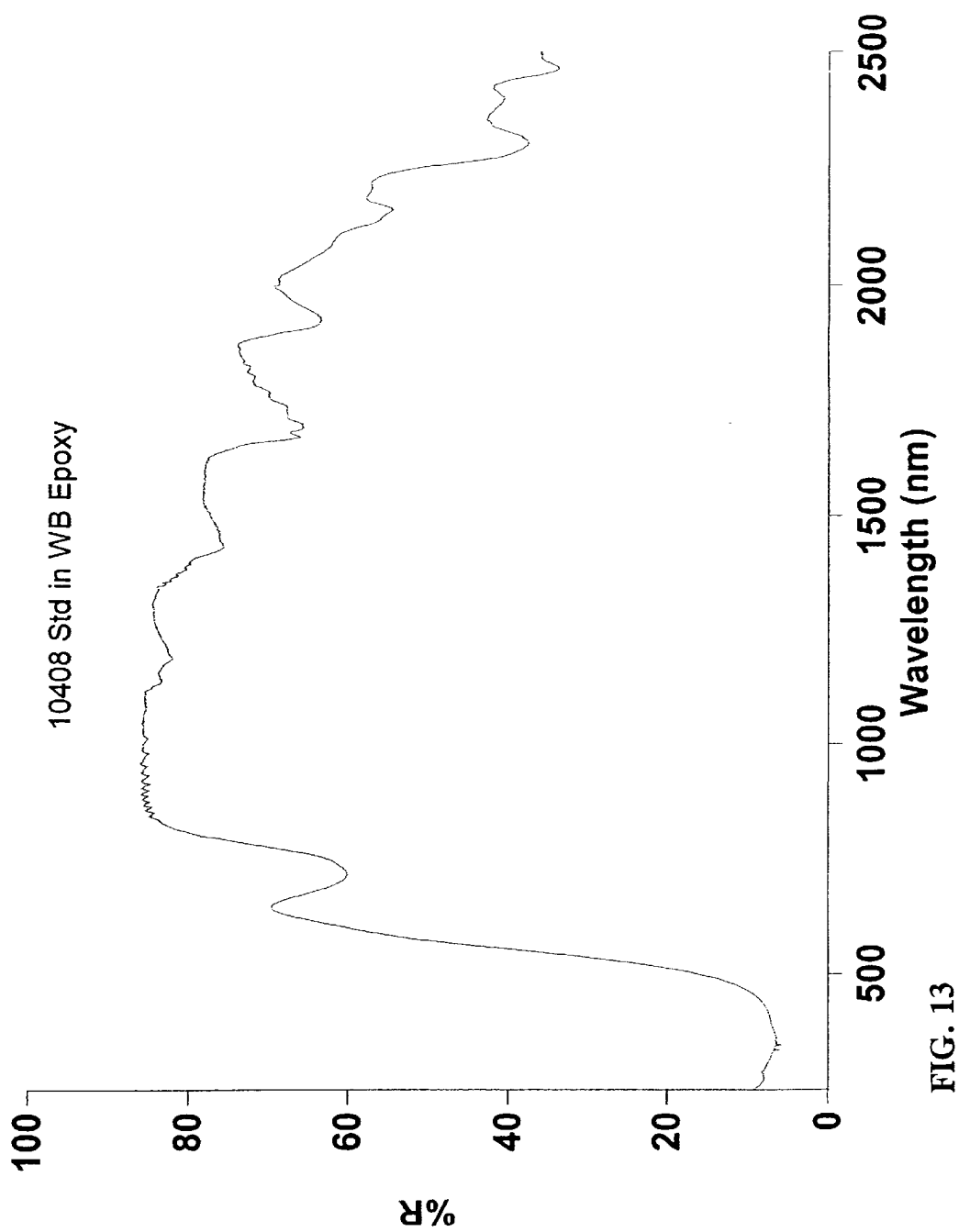
Figure 14:
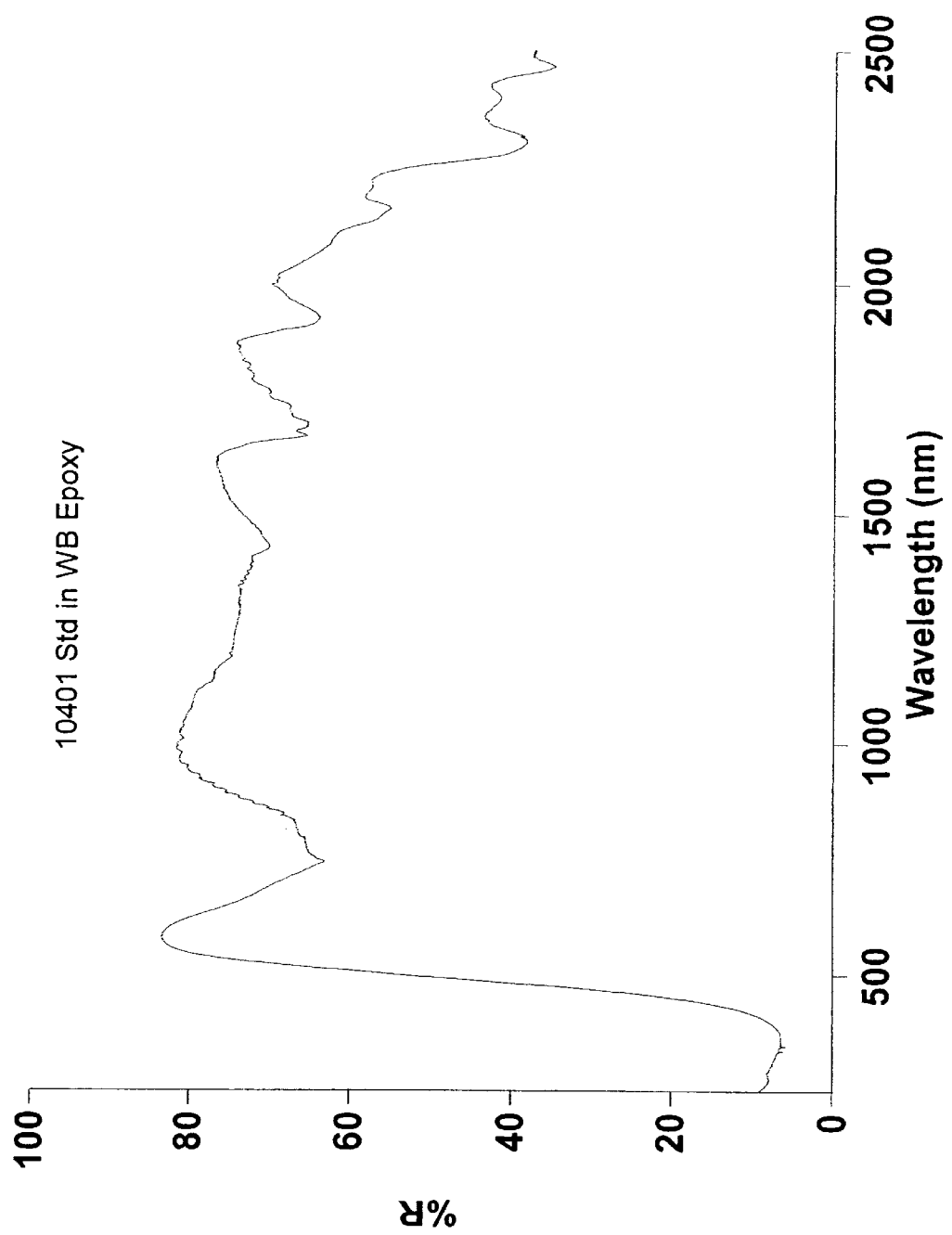

In order to demonstrate the visible and IR reflectance characteristics of the present bismuth-containing materials, some of the epoxy coating samples listed in Table 1 were tested for reflectance at wavelengths of from 300 to 2,500 nm. Graphs showing reflectance versus wavelength data for some of the epoxy coating samples are provided in FIGS. 2–11. Comparison curves for similar epoxy samples containing conventional TiO$_2$, 10401 (NiSbTi), and 10408 (CrSbTi) pigments are provided in FIGS. 12–14. Favorable IR reflectance properties are achieved by the present bismuth-containing compounds.

The heat build-up results of a number of the synthesized compounds are listed below.

TABLE 3

Heat Build-Up Results

| Sample | Ta | Tm | ΔTlu | ΔTv | ΔTh |
|---|---|---|---|---|---|
| Carbon Black | 72.3 | 216.1 | 143.8 | | |
| R960 TiO2 | 73.3 | 134.6 | 61.3 | 4.61 | 56.1 |
| 267-010-A | 73.5 | 135.9 | 62.4 | 46.5 | 56.6 |
| 267-010-A | 73.4 | 138.9 | 65.5 | 47.5 | 57.8 |
| 267-011-A | 72.9 | 138.1 | 65.2 | 47.3 | 57.5 |
| 174-115-E | 73.3 | 140.2 | 66.9 | 48 | 58.4 |
| 267-012-B | 73.2 | 140.3 | 67.1 | 48 | 58.4 |
| 267-016-B | 72.8 | 139.7 | 66.9 | 47.8 | 58.2 |
| 10401 NiSbTi | 72.9 | 136.9 | 64 | 46.9 | 57.1 |
| 10408 CrSbTi | 73 | 138.9 | 65.9 | 47.6 | 57.8 |

Ta = ambient air temperature in the lab
Tm = maximum temperature of specimen
ΔTlu = Tm—Ta
ΔT = ΔTlu/ΔTlb * ΔTh (or ΔTv)
ΔTlu = temperature rise above ambient temperature
ΔTv = for vertical position 74 degrees F.
ΔTh = for vertical position 90 degrees F.

Table 3 illustrates low heat build up properties for the darker color shades, which is comparable to the lighter TiO$_2$. Comparable IR reflectance performance is also shown in Table 3 for the present bismuth-containing compounds in comparison with standard 10401 and 10408 pigments used in the vinyl siding industry, which are known to be good for IR reflecting and heat build-up.

Whereas particular embodiments of this invention have been described above for purposes of illustration, it will be evident to those skilled in the art that numerous variations of the details of the present invention may be made without departing from the invention as defined in the appended claims.

What is claimed is:

1. A laser marked substrate comprising:
   a substrate:
   a bismuth-containing compound, which compound comprises the formula $Bi_xM_yO_z$ where M is selected from Zn, Ti, Fe, Cu, Al, Zr, P, Sn, Sr, Si, Y, Nb, La, Ta, Pr, Ca, Mg, Mo, W, Sb, Cr, Ba and Ce, x is from about 0.3 to about 70, y is from about 0.05 to about 8, and z is from about 1 to 100 dispersed in the substrate; and
   a laser-marked portion of the substrate exhibiting a contrasting mark compared with a non-laser marked portion of the substrate.

2. The laser marked substrate of claim 1, wherein the laser-marked portion and the non-laser marked portion of the substrate have a different lightness value ΔL if greater than about 20.

3. The laser marked substrate of claim 1, wherein the laser marked portion and the non-laser marked portion of the substrate have a different lightness value ΔL of greater than about 25.

4. The laser marked substrate of claim 1, wherein the laser-marked portion and the non-laser marked portion of the substrate have a different lightness value ΔL of greater than about 30.

5. The laser marked substrate of claim 1, wherein the laser-marked portion and the non-laser marked portion of the substrate have a different lightness value ΔL of greater than ΔL of greater than about 35.

6. The laser marked substrate of claim 4, wherein the laser-marked portion and the non-laser marked portion of the substrate have a different lightness value ΔL of greater than about 40.

7. The laser marked substrate of claim 1, wherein the ratio of x to y is greater than 2.

8. The laser marked substrate of claim 1, wherein the ratio of x to y is greater than 5.

9. The laser marked substrate of claim 1, wherein the ratio of x to y is greater than 10.

10. The laser marked substrate of claim 1, wherein M comprises Zn, Si, Zr, Al or Sn.

* * * * *

UNITED STATES PATENT AND TRADEMARK OFFICE
CERTIFICATE OF CORRECTION

PATENT NO. : 6,680,121 B2
DATED : January 20, 2004
INVENTOR(S) : George Emil Sakoske et al.

It is certified that error appears in the above-identified patent and that said Letters Patent is hereby corrected as shown below:

Column 14,
Line 29, "claim 4" should read -- claim 1 --.

Signed and Sealed this

Twenty-second Day of June, 2004

JON W. DUDAS
*Acting Director of the United States Patent and Trademark Office*